Dec. 6, 1938.  G. POTAPENKO  2,139,460
MEANS AND METHOD FOR GEOPHYSICAL PROSPECTING
Filed July 6, 1936  2 Sheets—Sheet 1
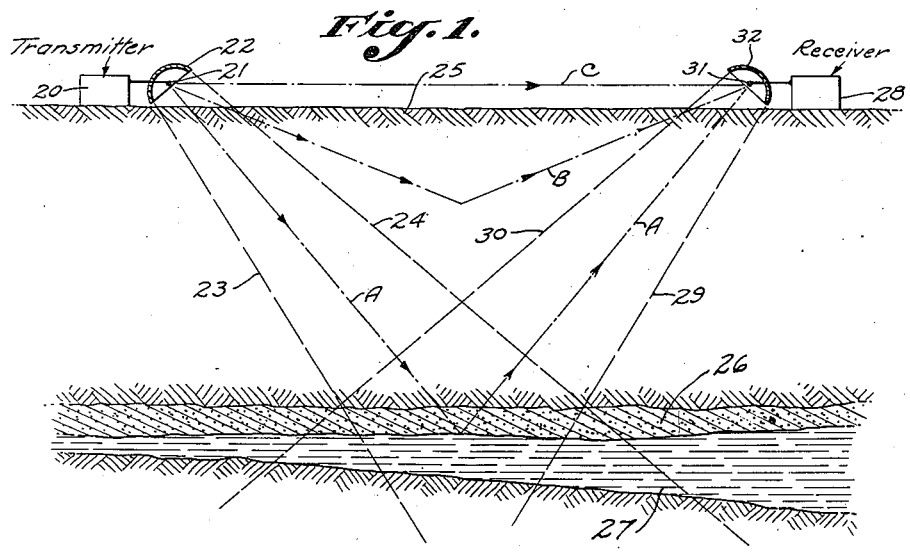
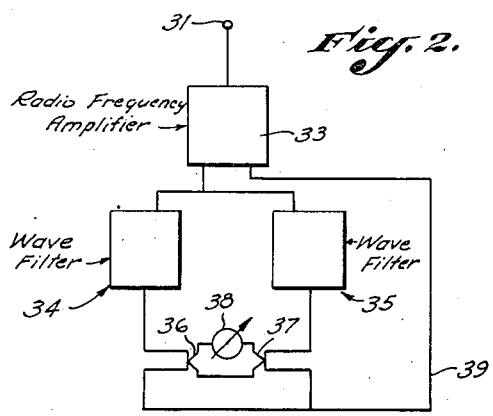
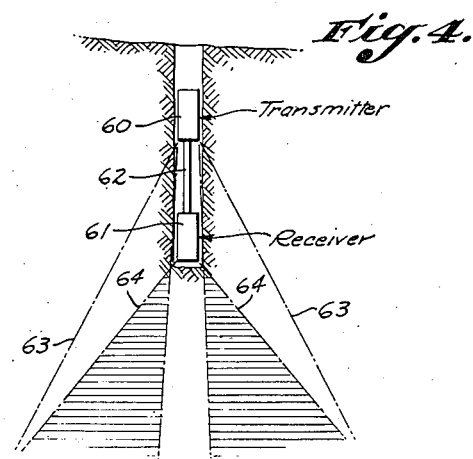
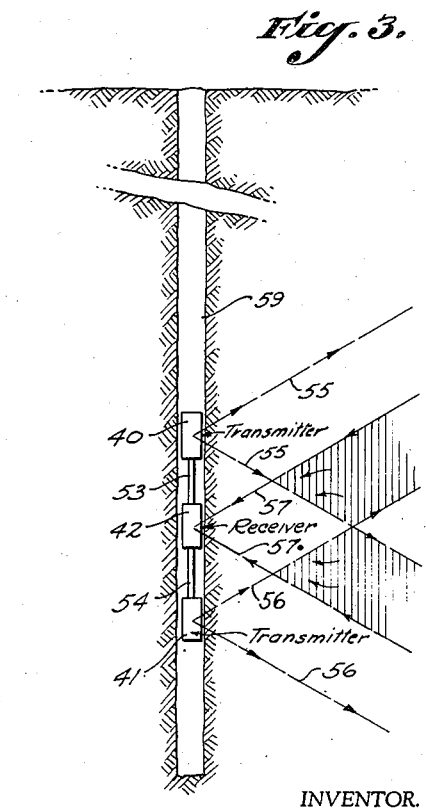
INVENTOR.
Gennady Potapenko,
BY Russell M. Otis
ATTORNEY.

Dec. 6, 1938.  G. POTAPENKO  2,139,460
MEANS AND METHOD FOR GEOPHYSICAL PROSPECTING
Filed July 6, 1936  2 Sheets-Sheet 2
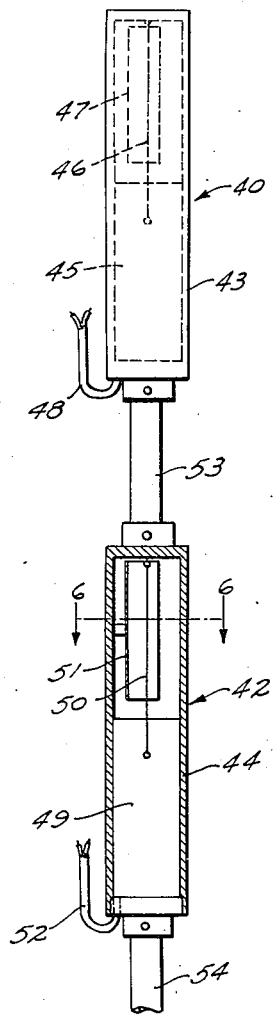
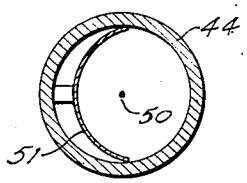
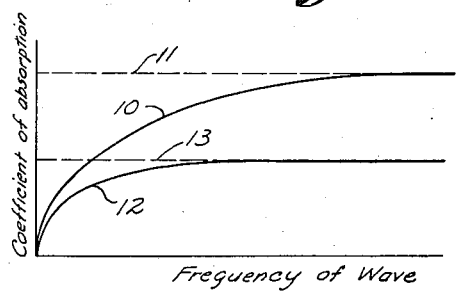
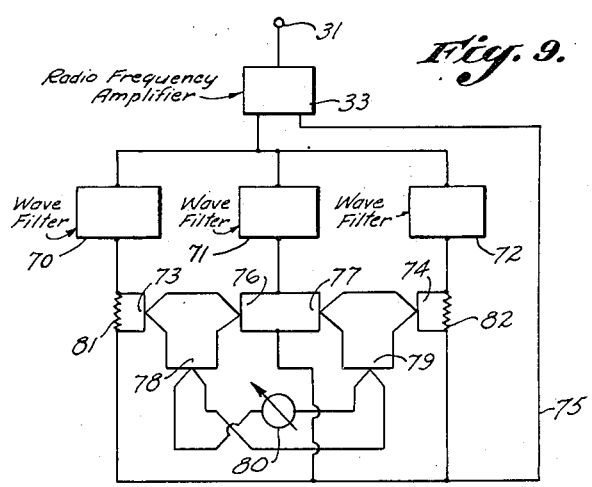
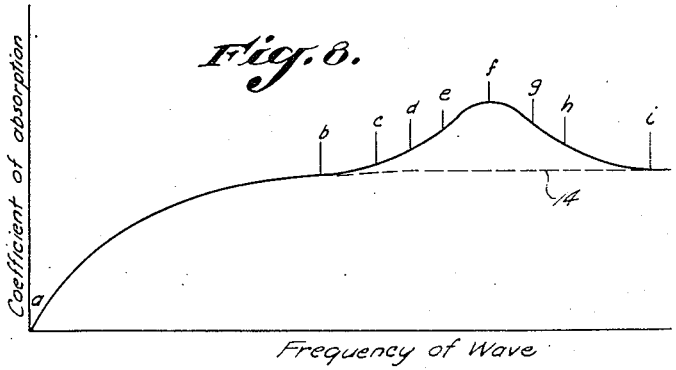
INVENTOR.
Gennady Potapenko,
BY Russell M. Otis
ATTORNEY.

Patented Dec. 6, 1938

2,139,460

UNITED STATES PATENT OFFICE 2,139,460

MEANS AND METHOD FOR GEOPHYSICAL PROSPECTING

Gennady Potapenko, Pasadena, Calif., assignor to Geo-Frequenta Corporation, a corporation of Delaware Application July 6, 1936, Serial No. 89,055

17 Claims. (Cl. 175—182)

This invention relates to means and a method for determining the presence of a body of a pre-selected substance, and is particularly well adapted to determine the presence of an oil bearing region in the earth without the necessity of boring into this region from the surface of the earth. More particularly, my invention relates to an electrical or electromagnetic method of prospecting. While my invention may be applied in detecting the presence of any substance exhibiting selective absorption in the electric spectrum, or one exhibiting a reaction on an electric disturbance which reaction depends upon the frequency and which reaction is different from the reaction which other substances exhibit, I will illustrate my invention as it applies to detection of oil in the earth.

It is known that many attempts have been made to determine the presence of oil in the earth by measuring the electrical resistance of the earth between two or more selected points and also by radiating an electromagnetic or radio wave and attempting to receive a reflected portion of the radiation from beneath an oil bearing layer in the earth. But these attempts have not been very satisfactory except under especially favorable circumstances because of several important limitations. Briefly, these limitations arise out of the following situation.

When, as is ordinarily done in the electromagnetic method, a substantially monochromatic wave is radiated without special precaution from a certain point, only a very small fraction of the energy radiated reaches the oil layer which it is desired to locate, the remainder of the energy being radiated in other directions and a very large part of that which is directed toward the oil layer being absorbed before reaching it. Likewise the receiver set up to receive the reflected waves receives only a negligible fraction of its total energy from the oil layer, because most of that received comes directly from the transmitter or as scattered or reflected radiation from locations other than the oil layer, and the part received by reflection from the vicinity of the oil layer is greatly diminished in intensity by absorption in passing through the earth. With so large a part of the received energy coming from areas where oil is not present, it is impossible to make any deductions on the basis of the received signal. Even if, by use of directive antennas, the energy received were limited to come only from the direction of oil-bearing regions, the energy received would, because of the very great absorption in the earth, in most cases be smaller than that classed as noise in the receiver. Every radio receiver has, in a given locality at a given time, a certain noise level, below which level of intensity any received signal would be confused with the irreducible electrical disturbances originating in the receiver itself or static or from the reception of unwanted radiation. It would do no good, in the ordinary methods of electromagnetic wave prospecting, to increase the degree of amplification in the receiver, for the undesired portion of the energy received would be amplified in the same degree as the energy coming from the oil bearing region and the ratio between the two would be unchanged.

Another difficulty besets the ordinary method of electromagnetic wave prospecting. If it is attempted to limit the angle within which radiation is transmitted and received, as suggested above, it will be found that efficient directive effects require the use of a high frequency radiation, but a wave of high frequency is absorbed much more readily by the earth than one of low frequency and results in practically no advantage to the ordinary method of electromagnetic wave prospecting.

With these problems in view, it is an object of my invention to provide a method for determining the presence of a body of a pre-selected substance and particularly to provide a method of determining the presence of oil in the earth.

Another object of the invention is to provide a method of determining the presence of a certain substance by observing a characteristic of the substance which is different for different frequencies of an electrical or electromagnetic exploring signal.

Another object is to provide an electromagnetic wave method of prospecting in which it is possible to obtain significant results even though the received energies are below the noise level of the receiver employed.

Still another object of my invention is to provide means adequate to carry out the methods above-referred to.

These objects I attain in a manner which will be apparent from a consideration of the following detailed explanation taken in connection with the accompanying drawings, of which:

Fig. 1 is a cross-sectional view of the earth, showing an oil-bearing stratum in the earth and the transmitter and receiver employed in my method located on the surface of the earth. The direction taken by the radiation is also shown.

Fig. 2 is a diagrammatic view of the equipment comprising the receiving means.

Fig. 3 is a sectional view through the earth, illustrating one application of my prospecting method.

Fig. 4 is a sectional view through the earth, illustrating another application of my prospecting method.

Fig. 5 is a partial cross-sectional view of the transmitting and receiving equipment employed in the applications of Figs. 3 and 4, showing schematically the arrangement of parts therein.

Fig. 6 is a sectional view of the apparatus shown in Fig. 5, taken on the line 6—6.

Fig. 7 is a graph showing the variation of coefficient of absorption with frequency for substances of high and low electrical conductivity which do not exhibit selective absorption.

Fig. 8 is a graph showing the variation of coefficient of absorption with frequency for a substance having selective absorption such as oil.

Fig. 9 is a diagrammatic view of an alternative form of part of the equipment comprising the receiving means.

My invention, as applied to the detection of oil, is based upon my discovery that crude oil has a selective absorption for electromagnetic radiation in that part of the spectrum corresponding to short and ultra-short radio waves. I have discovered that this selective absorption in crude oil in said part of the spectrum depends on the presence in crude oil of a group of compounds whose molecules exhibit the properties of permanent electric dipoles. I have found that the most important of these compounds, i. e. the compounds primarily responsible for said selective absorption, are oxygen compounds such as naphthenic acids and asphaltic products. Less important are nitrogen compounds and aromatic compounds present in some crude oils. The significance of this discovery can best be understood from a brief discussion of the general subject of absorption of radio frequency waves and its dependence upon the frequency of the radiation and nature of the absorbing medium.

Absorption of electromagnetic waves in a conductive medium may be of two kinds, namely, ordinary or conductive absorption, and selective absorption. The first kind, conductive absorption, is well understood and can be quantitatively derived from Maxwell's field equations. Suffice it to say, without entering into the mathematics involved, that the amount of absorption of an electromagnetic wave is determined by the frequency of the wave and certain properties of the medium through which it passes, namely, the dielectric constant, the electrical conductivity, and the magnetic permeability. The absorptive properties of a medium are generally expressed by reference to the "coefficient of absorption." The coefficient of absorption K is defined by the following equation:

$$I = I_0 e^{-Kz}$$

where $I_0$ is the intensity of the electromagnetic wave prior to entrance into the absorbing medium; $I$ is the intensity of the wave after passing through the absorbing medium; $z$ is the length of the path traversed by the wave through the absorptive medium; and $e$ is the logarithmic exponent.

The manner in which the coefficient of absorption K varies with frequency of the impinging wave is shown in Fig. 7, for media which do not show selective absorption. The curve 10 is that for a medium of high electrical conductivity. It will be noted that the curve rises rapidly, flattens out and approaches the horizontal line 11 as an asymptote. The curve 12 is that for a medium of lower electrical conductivity. Although the shape of the two curves is similar, it will be observed that curve 12 approaches its asymptote 13 more rapidly and is substantially flat at a lower frequency than is curve 10.

Contrasted to these curves is the curve shown in Fig. 8 representing the variation of the coefficient of absorption K with frequency of the impinging wave in a medium exhibiting selective absorption, such as an oil bearing medium. Here the curve between points $a$ and $b$ and beyond $i$ has the shape characteristic of conductive absorption, but between the points $b$ and $i$ the curve rises to a maximum at $f$ and again descends to meet the normal conductive absorption curve shown by the dotted line 14. The hump in the curve between $b$ and $i$ is due to selective absorption by the oil of waves of the frequency corresponding to that region. Selective absorption of electromagnetic waves is not shown by all substances. It is regarded principally as a phenomenon associated with that of anomalous dispersion. It may also exist in some substances because of their inhomogeneous condition, in which case the selective absorption is known as Wagner's absorption. My invention is applicable and I intend that it shall be employed as hereinafter described, in determining the presence of a substance by detecting its property of selective absorption regardless of what the cause or the explanation of the selective absorption might be.

The generally accepted theory of anomalous dispersion and its accompanying selective absorption in the region of short and ultra-short radio waves is that the substances exhibiting these phenomena have molecules possessing permanent dipoles. In the light of this theory one can easily understand why the presence in crude oil of compounds like naphthenic acids, asphaltic products, and other compounds mentioned above imparts to crude oil the property of selective absorption. Ordinarily the molecules possessing permanent dipoles orient themselves at random; but when an electric field is applied, they tend to orient themselves in the direction of the electric field. Due to resisting viscous forces, however, the rotation of the molecules is accompanied by absorption of energy and a certain small amount of time is required for the molecules to all orient themselves with the field.

It will be obvious, therefore, that when an alternating electric field is applied, as when an electromagnetic wave passes, the molecules will rotate to some extent but will not have time before reversal of the field to completely align themselves with the field, and the higher the frequency, the less will be their rotation. Thus, passage of an electromagnetic wave through the medium exhibiting this effect results in absorption of energy in an amount depending upon the frequency. It is easy to see that this absorption should rise to a maximum at a certain frequency and decrease again for higher frequencies. For at low frequencies the frictional energy loss due to rotation of the molecular dipoles is small because the rate of rotation is small. As the frequency increases, the energy loss at first increases because the rate of rotation also increases; but as the frequency increases the amplitude of rotation decreases due to a shorter available time for rotation and at some frequency these two effects balance and the absorption having reached a maximum starts to decrease. For frequencies beyond this the absorption due to dipolar dispersion continually decreases because of smaller and smaller rotations. This absorptive effect thus is limited to a certain frequency range and is, therefore, termed selective absorption.

Because selective dipolar absorption of electromagnetic waves takes place by reason of rotation of molecular dipoles, the effect is confined to liquids. Solids cannot show the effect because their molecules are not free to rotate. Gases cannot show the effect because no frictional loss accompanies the rotation of gaseous molecules. Considering the liquid substances present in the earth, all of the saline solutions such as salt water and all of the soils containing these substances show the characteristics of conductive absorption. Water itself exhibits selective absorption but only in a region close to the infrared part of the spectrum, namely from about $3 \times 10^9$ to $3 \times 10^{12}$ cycles per second. Oil exhibits its selective dipolar absorption in the region from about $10^6$ to $10^9$ cycles per second. The exact position of the maximum in K depends upon temperature and other factors, but it always lies within this region which, in terms of wavelength, is from about 0.3 to 300 meters. From the foregoing it will be clear that oil is the only substance found in the earth which exhibits dipolar selective absorption in the frequency region from $10^6$ to $10^9$ cycles per second.

In making this discovery, I have laid a basis for a method of positively identifying oil, for if the measurement shows that the curve of absorption coefficient versus frequency has a shape in this region of frequencies similar to that shown in Fig. 8, I can be positive oil has been traversed by the measured radiation. The preferred method by which I determine the shape of the K vs. frequency curve makes possible the efficient use of these high frequencies and is as follows:

The arrangement of apparatus when oil is to be located by operations from the earth's surface is shown in Fig. 1. The radio transmitter 20 located on the earth's surface is connected to an antenna 21 which is of the directional type. I have illustrated the antenna as partly surrounded by a parabolic reflector 22 so arranged that the waves radiated from the antenna are practically limited to the angle represented as bounded by the lines 23 and 24 extending into the earth 25. Any of the well-known types of directional antenna, however, may be employed in place of that illustrated. The waves follow the direction A down through the oil bearing layer 26 and are in large measure reflected back through the oil layer by the salt water layer 27 generally found directly beneath. The reflected waves travel the path A in the direction of the arrows up to the surface where they are received by the radio receiver 28. The receiver 28 is adapted to receive only waves which come from the angle between lines 29 and 30 by virtue of its connection to the antenna 31 which is of the directive type and here illustrated as partly surrounded by the parabolic reflector 32. Here, again, any of the well known types of directive antennas may be employed for this purpose.

It has previously been pointed out that without directive antennas on the receiver and transmitter the received radiation that has followed the paths B and C is so large compared to that which follows the path A that A is practically a negligible fraction of the whole. Under such circumstances, since the component following A is the only part from which deductions as to presence of oil can be made, it would be practically impossible to make significant observations. By the use of directive antennas, however, I limit the radiation received almost entirely to just that component which I desire to measure and hence make possible significant observations. It should be noted that in the frequency band within which oil exhibits selective dipolar absorption, namely, about $10^6$ to $10^9$, depending upon the kind of oil and the temperature of it, directive antennas are very efficient.

As has previously been pointed out, the absorption by the earth of waves of these high frequencies is very great, and when the oil layer is very deep in the earth any particular wave may be reduced in intensity to a level below the noise level of the receiver. I solve this problem by sending out from the transmitter 20 electromagnetic waves of two or more frequencies and by providing the receiver 28 with a special device for measuring the relative intensities of waves of these several frequencies. The transmitter 20 may be of any type known in the radio art for generating two frequencies simultaneously. Particularly suitable for this purpose is a transmitter of a so-called push-pull type similar to one of those shown in Figs. 77 and 81 of "Phenomena in High-Frequency Systems" by August Hund, Published by McGraw-Hill Book Co. Inc., 1936, and in which the two vacuum tubes comprising the generators have sufficiently different characteristics as oscillators to result in generation of two separate frequencies. Of course, other frequencies may also be transmitted; the essential thing is that the transmitter shall transmit more than one frequency. The transmitted frequencies are altered by varying the inductances and capacities in the circuit as is well known in the radio art.

In the case in which waves of two frequencies are transmitted, the receiver 28 is tuned sufficiently broadly to receive substantially equally the two waves of different frequency and is equipped with a special measuring device as shown schematically in Fig. 2. Here the antenna 31 is shown connected to the radio-frequency amplifier 33. The radio-frequency amplifier may be of any type known in the radio art which is adapted to receive and amplify short or ultra-short radio waves. The output from the amplifier 33 goes to both wave filter 34 and wave filter 35. Wave filter 34 is adapted to pass one of the transmitted frequencies but to not pass the other. Wave filter 35 is adapted to pass the other of the two transmitted frequencies but to not pass the frequency passed by wave filter 34. In this manner that part of the two component waves transmitted by transmitter 20 and received by receiver 28 is separated into two signals, one including all of one wave, and the other including all of the other wave. It is preferable that the wave filters 34 and 35 be of the band pass type and that each pass a band of frequencies of about the same width. Filters of this type are well known in the art. Reference is hereby made to the volume "Phenomena in High-Frequency Systems" by August Hund, published by McGraw-Hill Book Co. Inc., 1936, Fig. 326C and Section 189 in which filters of this type are illustrated and their theory explained. It will be understood that tuning of the filters employed is accomplished by variation of the inductances and capacities in the circuit as is well known in the radio art.

Whereas the current passing through each of the two filters may be separately measured and the two measurements then be compared, I prefer the following arrangement illustrated in Fig. 2. In this arrangement, the output from filter 34 passes through the heater of thermocouple 36 and back to the other output terminal of the amplifier through lead wire 39. The output from filter 35 passes through the heater of thermocouple 37 and connects with the lead wire 39. The two couples are connected in opposition through the galvanometer 38 in which a way that when the currents through the two filters 34 and 35 are equal the current through the galvanometer 38 will be zero. The amount of the galvanometer deflection in any direction is a measure of how much greater is the current through one wave filter over that through the other.

Thus a direct observation of the relative intensities of the two waves of different frequency is made. It is important to note that this measured difference is the same regardless of how much current due to such variable spurious factors as "noise" and extraneous radiation are present in the receiver, and the measurement is significant even though the intensities of both waves are below the noise level of the receiver. This is because the amount of "noise" and extraneous radiation is substantially the same for both frequencies if these frequencies are close together, and therefore "noise" and extraneous radiation will come through filters 34 and 35 in substantially equal amount and leave the galvanometer unaffected. This is an extremely important advantage because it permits the amplification of the receiver to be increased to a point where the feeble radiation from the oil layer may be measured in the above-described manner.

Furthermore, practically only the radiation which has passed through an oil bearing layer is effective in producing a measurable difference on the galvanometer 38. This is because the two transmitted waves having frequencies near one another as $c$ and $d$ in Fig. 8 will be absorbed to a degree represented by the ordinate of the dotted curve 14 at abscissae $c$ and $d$ wherever they pass through soil containing no oil. Those scattered and unwanted radiations will, therefore, produce only a very small deflection of the galvanometer because the ordinates of the curve 14 are nearly equal for the frequencies $c$ and $d$. Those radiations, however, which pass through oil produce a deflection on the galvanometer proportional to the difference between the ordinates of the solid curve of Fig. 8 at abscissae $c$ and $d$. This quantity is much larger than the first, which means that the actual measurement made is almost entirely a measure of the effect of oil on the received radiation, and conflicting causes are reduced to a minimum.

In the operation of my invention I may transmit from the transmitter 20 waves of frequencies $c$ and $d$, preferably of equal intensity. My receiver 28 is tuned to receive these waves equally well. The wave filter 34 is tuned to pass wave $c$ and the wave filter 35 is tuned to pass wave $d$. The deflection of the galvanometer 38 is observed. The transmitter may then be returned to send out waves of frequencies $d$ and $e$ differing by the same frequency interval as between $c$ and $d$. The waves $d$ and $e$ are preferably of equal intensity and of intensity equal to those previously sent out of frequencies $c$ and $d$. The filter 34 is re-tuned to pass wave $d$, the filter 35 is retuned to pass the wave $e$, and the galvanometer deflection is noted. In this manner the entire region of the spectrum in which selective absorption by oil is expected may be traversed. I may tune the transmitter to send out waves of frequencies $g$ and $h$, and tune filter 34 to pass wave $g$ and filter 35 to pass wave $h$, and note the direction and magnitude of the galvanometer deflection.

The galvanometer deflection is a measure in direction and magnitude of the difference in intensities of the two received waves. Such a difference is due to a difference in the absorption coefficient of the medium traversed for the two frequencies. The higher the absorption coefficient, the lower is the received intensity provided the transmitted energies are the same. With these facts in mind, the galvanometer deflections may be interpreted as follows.

Should it be found that the direction of the galvanometer deflection indicates a higher received intensity for a wave of a certain frequency $h$ than for companion wave $g$ of lower frequency, it would mean that the coefficient of absorption for wave $h$ is less than that for wave $g$ of lower frequency, which condition is a positive indication of oil if found in the region in which selective absorption by oil takes place. It is a positive and unmistakeable indication because it is only in the region of frequencies immediately beyond a point of maximum absorption that this is possible, and such a maximum occurs only through selective absorption.

In working on the low frequency side of the maximum, in the region from $b$ to $f$, if the galvanometer deflection indicates that the received intensity of wave $d$ is less than the intensity of its companion wave of lower frequency $c$, it means that the absorption coefficient for wave $d$ is higher than for wave $c$ as shown in Fig. 8, and if the magnitude of this deflection is greater than that ordinarily obtained in that type of soil it is a good indication of the presence of oil. If in addition, the galvanometer deflection indicates that the absorption coefficient for wave $e$ of higher frequency is greater than for wave $d$ and that the galvanometer deflection for waves $d$ and $e$ is greater than for waves $c$ and $d$ it means that the curve of K vs. frequency is rising at an increasing rate which can only happen where there is selective absorption. This condition, then, is a positive indication of the presence of oil if it is found in that part of the spectrum where the selective absorption of oil takes place. This condition may be expressed mathematically by the statement that $$\frac{\delta^2 K}{\delta F^2} > 0$$

where F represents frequency. Contrasted to this condition, where no selective absorption takes place but only conductive absorption occurs, $$\frac{\delta^2 K}{\delta F^2} < 0$$

I may indicate directly $$\frac{\delta^2 K}{\delta F^2}$$

by transmitting waves of three or more frequencies, such as $c$, $d$, and $e$, from a transmitter, receiving these waves after reflection from within the earth, separating the currents corresponding in frequency to the received waves by means of three filters and measuring the relative differences between the magnitudes of these currents. A schematic diagram of a measuring circuit designed to be employed for this purpose is shown in Fig. 9. The filters 70, 71, and 72 are connected to the output from the receiver amplifier and are adapted to separate the three frequency components, frequency c through filter 72, d through 71, and e through 70. The currents through filters 70 and 72 pass through heaters of thermocouples 73 and 74, respectively, and through the shunting resistors 81 and 82, respectively of equal resistance thereto, and back to output lead 75 of the receiver amplifier. The current through filter 71 divides and passes in equal amount through the heaters of thermocouples 76 and 77. The couples of thermocouples 73 and 76 are connected in opposition through the heater of thermocouple 78 which then measures the difference between the currents through thermocouples 76 and 73. The couples of thermocouples 74 and 77 are connected in opposition through the heater of thermocouple 79 so that it measures the difference between the currents through thermocouples 74 and 77. The couples of thermocouples 78 and 79 are connected in opposition through the galvanometer 80 so as to measure the difference between the currents through thermocouples 79 and 78. Thus the galvanometer 80 measures the amount by which the difference in intensities of received waves c and d is greater than the difference in intensities of the received waves d and e. If this galvanometer deflection is positive it is an indication that $$\frac{\delta^2 K}{\delta F^2} > 0$$

and that the waves have passed through a region exhibiting selective absorption.

It will at once be clear that I have provided a method of positively determining the presence of oil in the earth which method does not depend upon the absolute values of the quantities measured but only on their relative values, and that such a method is capable of high accuracy.

In exploring the earth with the apparatus shown in Figs. 1 and 2, a complete set of observations may be made with the antennas of transmitter and receiver directed so as to operate with beams intersecting at a certain depth in the earth. The antennas may then be rotated to new positions in which the beams intersect at a greater depth in the earth, and when indication of the presence of oil is found, its approximate depth is also determined within certain limits by the angles of the beams, and the distance between transmitter and receiver, as will be obvious.

Instead of working with the instruments on the surface of the ground I may locate the transmitter and receiver in shallow holes in the earth and thereby further reduce the stray radiation traversing the path C in Fig. 1 and also reduce other unwanted radiation which would otherwise be received by the receiver.

I may adapt my method to take advantage of a partially drilled oil well to get closer to the oil to be located. Oftentimes after drilling a well to the depth where oil is expected and no oil is found, it is difficult to decide whether further drilling should be conducted. To aid in a situation of this kind, I arrange my apparatus as in Fig. 3. Two transmitters 40 and 41 are employed of the same type as transmitter 20 previously described. One receiver 42 is employed of the same type as receiver 28 previously described. These transmitters and receivers are arranged to be enclosed in cylindrical casings 43 and 44 respectively, shown in Fig. 5, the casings being of a dielectric material such as quartz or other suitable substance. Within the casing 43 is the transmitter proper 45 which is connected to the antenna 46 of the directive type, here shown as being partly surrounded by a parabolic conductor 47. Leads 48 passing through the casing permit control of the transmitter. Within the receiver casing 44 is the receiver proper 49 connected to an antenna 50 of the directive type, here shown as partly surrounded by a parabolic conductor 51. Leads 52 permit the output from the receiver to be measured at a distance therefrom. The receiver unit 42 is connected mechanically at one end to the transmitter unit 40 by member 53 and at the other end to the transmitter unit 41 by member 54, the three units being mechanically held in fixed positions relative to one another with all of their antennas oriented in the same direction. The three connected units are made of such a diameter that they can be lowered into the partially drilled hole 59 below the iron casing. When in position in the hole the transmitters 40 and 41 are operated to send out beams lying within the angles defined by the lines 55 and 56 respectively. The receiver 42 can pick up radiation from the region defined by the lines 57. Hence from anywhere in the shaded areas radiation may be scattered or reflected and return to be received by the receiver 42. If these waves traverse oil they will be selectively absorbed and will be detected by the deflection of the galvanometer as previously described. Wires leading to the earth's surface may be employed in operating and controlling the transmitters and receiver and in making the measurements, or automatic registering equipment may be employed in the hole. The technique of observation is the same as that previously described for work from the surface of the earth, both transmitters and receiver being equipped to perform all the functions there described with the exception that in the present case the antennas of receiver and transmitter are fixed in relation to each other. The whole transmitter-receiver assembly may be oriented to face in different directions in the hole and observations will then indicate the direction in which oil lies.

A similar form of apparatus may be employed as in Fig. 4 to explore the region directly beneath a partially drilled well. Here one transmitter 60 is used with one receiver 61, the two units being connected mechanically by the member 62. The transmitter and receiver are of construction similar to the units 40 and 42 except that their antennas are designed and located in the units to transmit radiation only downwardly and to receive radiation only from the downward direction. In the drawings, transmitter 60 is represented as transmitting only within the region defined by lines 63 and receiver 61 is represented as receiving only from the region defined by lines 64. Thus waves scattered or reflected from the shaded areas will be received by the receiver and if they have traversed oil this fact may be ascertained in the manner above described, the technique of observation remaining the same.

Where I have illustrated my invention as employing certain specific forms of apparatus, it is understood that equivalent apparatus may be substituted therefor. For instance, rectifiers or any other suitable devices for translating an alternating current into a direct current may be employed in place of the thermocouples shown in Figs. 2 and 9, in a manner well known in the art. Other variations and modifications within the spirit of the invention may be made by those skilled in the art, and I, therefore, wish to be limited in the protection secured only by the appended claims.

What I claim is:

1. A method of determining the presence of a substance having a selective effect with respect to frequency of an imposed electric field which includes simultaneously subjecting the same part of said substance to two electric fields of different frequency, and simultaneously measuring the effect of said substance upon said electric fields of different frequency, whereby are largely eliminated errors in the relative effect due to variable spurious factors.

2. A method of determining the presence of a substance exhibiting the property of selective absorption of electromagnetic radiation which comprises simultaneously traversing said substance with electromagnetic radiation including waves of two different frequencies, and indicating the relative simultaneous absorption by said substance of the two waves, whereby are largely eliminated errors due to variable spurious factors.

3. A method of determining the presence of oil which comprises traversing said oil with electromagnetic radiation including waves of two different frequencies, measuring the intensities of said waves prior to traversing said oil, and simultaneously measuring the intensities of said waves after having traversed said oil, whereby selective absorption by the oil may be determined, and errors due to variable spurious factors are largely eliminated.

4. A method of determining the presence of oil which comprises simultaneously traversing said oil with electromagnetic waves of two different frequencies but of substantially equal intensity, and indicating the relative intensities of said waves after having passed through said oil.

5. A method of determining the presence of oil which comprises simultaneously directing into said oil electromagnetic radiation including waves of two different frequencies, translating said radiation, after having traversed said oil, into electric currents of corresponding frequency, separating said currents into the two frequency components, and indicating the relative intensity of the two component currents.

6. A method of geophysical prospecting which comprises transmitting into the earth a directed beam of electromagnetic radiation including waves of two different frequencies, directively receiving a portion of said radiation after traversing earth, and simultaneously measuring the received intensities of said two waves, whereby the relative effect of the earth upon said two waves is determined largely without error due to variable spurious factors.

7. A method of geophysical prospecting for oil which comprises directively transmitting into the earth a beam of electromagnetic radiation including waves of two different frequencies lying between $10^6$ and $10^9$, directively receiving a portion of said radiation reflected from within the earth, and measuring the intensities of said two waves.

8. A method of geophysical prospecting for oil which comprises directively transmitting into the earth a beam of electromagnetic radiation including waves of two different frequencies lying between $10^6$ and $10^9$, directively receiving a portion of said radiation reflected from within the earth, translating said two waves into separate electric currents, and indicating the relative intensity of the two currents.

9. A method of determining the presence of oil in the earth which comprises directively transmitting from a location below the earth's surface a beam of electromagnetic radiation into the earth, said beam including waves of two different frequencies lying between $10^6$ and $10^9$, directively receiving a portion of said radiation reflected from within the earth, and measuring the intensities of said two waves.

10. Apparatus for geophysical prospecting comprising means for simultaneously subjecting a portion of the earth to electric fields of different frequency, and means for indicating the relative simultaneous effect of the earth upon said electric fields, in such manner that the indicated relative effect is largely without error due to variable spurious factors.

11. Apparatus for geophysical prospecting comprising means for transmitting into the earth electromagnetic radiation including waves of two different frequencies, and means for receiving a portion of said radiation reflected from within the earth and for indicating the relative intensity of the simultaneously received waves of said portion having said two frequencies, in such manner that the indicated relative intensity is largely without error due to variable spurious factors.

12. Apparatus for geophysical prospecting comprising means for transmitting into the earth electromagnetic radiation including waves of two different frequencies, means for receiving a portion of said radiation reflected from within the earth and for simultaneously translating said two received waves into separate electric currents, and means for indicating the relative magnitude of the two currents.

13. Apparatus for geophysical prospecting comprising means for directively transmitting into the earth electromagnetic radiation including waves of two different frequencies, and means for directively receiving and for measuring the relative intensity of the simultaneously received portions of said two waves reflected from within the earth, whereby the relative effect of the earth upon the two waves may be determined largely without error due to variable spurious factors.

14. Apparatus for determining the presence of oil in the earth comprising a directive transmitter adapted for transmitting into the earth a beam of electromagnetic radiation including waves of two different frequencies lying between $10^6$ and $10^9$, and a directive receiver adapted to receive portions of said two waves reflected from within the earth, said receiver including means for measuring the relative intensity of said two received waves.

15. Apparatus for determining the presence of oil in the earth comprising a directive transmitter adapted to transmit into the earth a beam of electromagnetic radiation including waves of two different frequencies lying between $10^6$ and $10^9$, means for directively receiving and translating into electric currents portions of said two waves reflected from within the earth, means for separating said electric currents corresponding to said two received waves, and a measuring instrument for indicating the relative magnitude of said currents.

16. In apparatus for geophysical prospecting, the combination of a directive receiver of electromagnetic waves adapted to translate said radiation into electric current of corresponding frequency, two filters connected to the output of said receiver and each adapted to pass a current of different frequency from that of the other, and means for indicating the difference of the currents through the two filters.

17. Apparatus for geophysical prospecting comprising means for transmitting into the earth electromagnetic radiation including a series of waves of progressively increasing frequency, and means for receiving a portion of said radiation reflected from within the earth and for measuring the difference in intensity of two of the simultaneously received waves defining one frequency interval relative to the difference in intensity of two of said simultaneously received waves defining another frequency interval, whereby the character of the relationship between coefficient of absorption and frequency of said radiation may be determined for the selected frequency range.

GENNADY POTAPENKO.